(12) United States Patent
Izumi

(10) Patent No.: US 7,066,386 B2
(45) Date of Patent: Jun. 27, 2006

(54) LOADING APPARATUS FOR CARD TYPE RECORDING MEDIUMS

(75) Inventor: Hideaki Izumi, Tokyo (JP)

(73) Assignee: Sony Corporation (JP)

( * ) Notice: Subject to any disclaimer, the term of this patent is extended or adjusted under 35 U.S.C. 154(b) by 13 days.

(21) Appl. No.: 11/039,942

(22) Filed: Jan. 24, 2005

(65) Prior Publication Data

US 2005/0189424 A1   Sep. 1, 2005

(30) Foreign Application Priority Data

Feb. 10, 2004   (JP) ............................ P2004-033994

(51) Int. Cl.
*G06K 13/00* (2006.01)

(52) U.S. Cl. ...................... 235/381; 235/475

(58) Field of Classification Search ................ 235/441, 235/486, 487, 475, 479, 483, 381, 383, 492
See application file for complete search history.

(56) References Cited

U.S. PATENT DOCUMENTS 5,667,395 A * 9/1997 Okada et al. ............... 439/131
6,173,405 B1 * 1/2001 Nagel .......................... 726/21
6,705,529 B1 * 3/2004 Kettunen et al. ........... 235/486
2002/0061672 A1 * 5/2002 Burkart ....................... 439/260
2004/0041024 A1 * 3/2004 Liu et al. .................... 235/441
2004/0076048 A1 * 4/2004 Kabenjian et al. .......... 365/200
2006/0011723 A1 * 1/2006 Yeh ............................. 235/441

FOREIGN PATENT DOCUMENTS

JP         11-110880         4/1999

* cited by examiner

*Primary Examiner*—Thien M. Le
(74) *Attorney, Agent, or Firm*—Rader, Fishman & Grauer PLLC; Ronald P. Kananen

(57) ABSTRACT

A loading apparatus for card type recording mediums comprises a first loading section for receiving a first IC card and a second loading section for receiving a second IC card, the first loading section and the second loading section being arranged in parallel with each other at the side of the top surface of the apparatus, along with a third loading section for receiving a third IC card arranged at the side of the bottom surface of the apparatus. The apparatus main body is connected to a host apparatus such as a personal computer by way of a cable. The first and second loading sections are provided with respective bulged sections showing plan views similar to those of the IC cards to be received therein so that the user can identify the loading sections simply by touching them.

9 Claims, 11 Drawing Sheets

LOADING APPARATUS FOR CARD TYPE RECORDING MEDIUMS

BACKGROUND OF THE INVENTION

1. Field of the Invention

This invention relates to a loading apparatus for card-type recording mediums adapted to receive a plurality of different flat card-type recording mediums.

This application claims priority of Japanese Patent Application No. 2004-033994, filed on Feb. 10, 2004, the entirety of which is incorporated by reference herein.

2. Description of Related Art

Card-type recording mediums such as IC cards, conforming to various different standards are being popularly used. Card-type recording mediums conforming to various different standards can record various data including image data, moving image data, music data, and document data. While such recording mediums may be used for the same or similar purposes, many of them show different profiles and are designed to be used with different interfaces, so that normally it is not possible to use the same loading apparatus for card-type recording mediums of different shapes. Thus, users have to possess different loading apparatuses that can be used with the different card-type recording mediums of different shapes that they have. It may be cumbersome to possess a number of different loading apparatuses.

To avoid this problem, a loading apparatus provided with loading sections, or loading slots, for receiving card-type recording mediums of different shapes has been proposed (see, inter alia, Patent Document: Japanese Patent Application Laid-Open Publication No. 11-110880). Such a loading apparatus is convenient because the user can use card-type recording mediums of different shapes if he or she possesses them. However, when a loading apparatus is equipped with loading slots for receiving card-type recording mediums of different shapes, the user may load a card-type recording medium into an incorrect slot. If the user loads a card-type recording medium deep into an incorrect slot, it may not be possible to remove it. Then, a machine trouble may occur.

SUMMARY OF THE INVENTION

In view of the above identified problem, it is therefore the object of the present invention to provide a loading apparatus for card-type recording mediums having loading sections for receiving card-type recording mediums of different shapes that is adapted to prevent a card-type recording medium from being put into an incorrect loading section.

According to the invention, the above object is achieved by providing a loading apparatus for card-type recording mediums adapted to receive flat card-type recording mediums of at least two different shapes, the apparatus comprising: an apparatus main body, a first loading section continuously extending from a first loading/unloading aperture arranged on the apparatus main body so as to receive a first card-type recording medium, a second loading section continuously extending from a second loading/unloading aperture arranged on the apparatus main body so as to receive a second card-type recording medium, and an interface arranged in the apparatus main body and adapted to be connected to external equipment. A first bulged section is arranged on the first loading section and a second bulged section is arranged on the second loading section, the second bulged section having a size different from that of the first bulged section.

Thus, according to the invention, a first bulged section is arranged on the first loading section and a second bulged section is arranged on the second loading section of the apparatus main body so that the user can discriminate the first loading section from the second loading section by the difference of position and touch between the two loading sections. Then, it is possible to prevent an IC card from being inserted into an incorrect loading section.

DETAILED DESCRIPTION OF THE PREFERRED EMBODIMENTS

Now a loading apparatus for IC cards according to the invention will be described by referring to the accompanying drawings.

Figure 1:
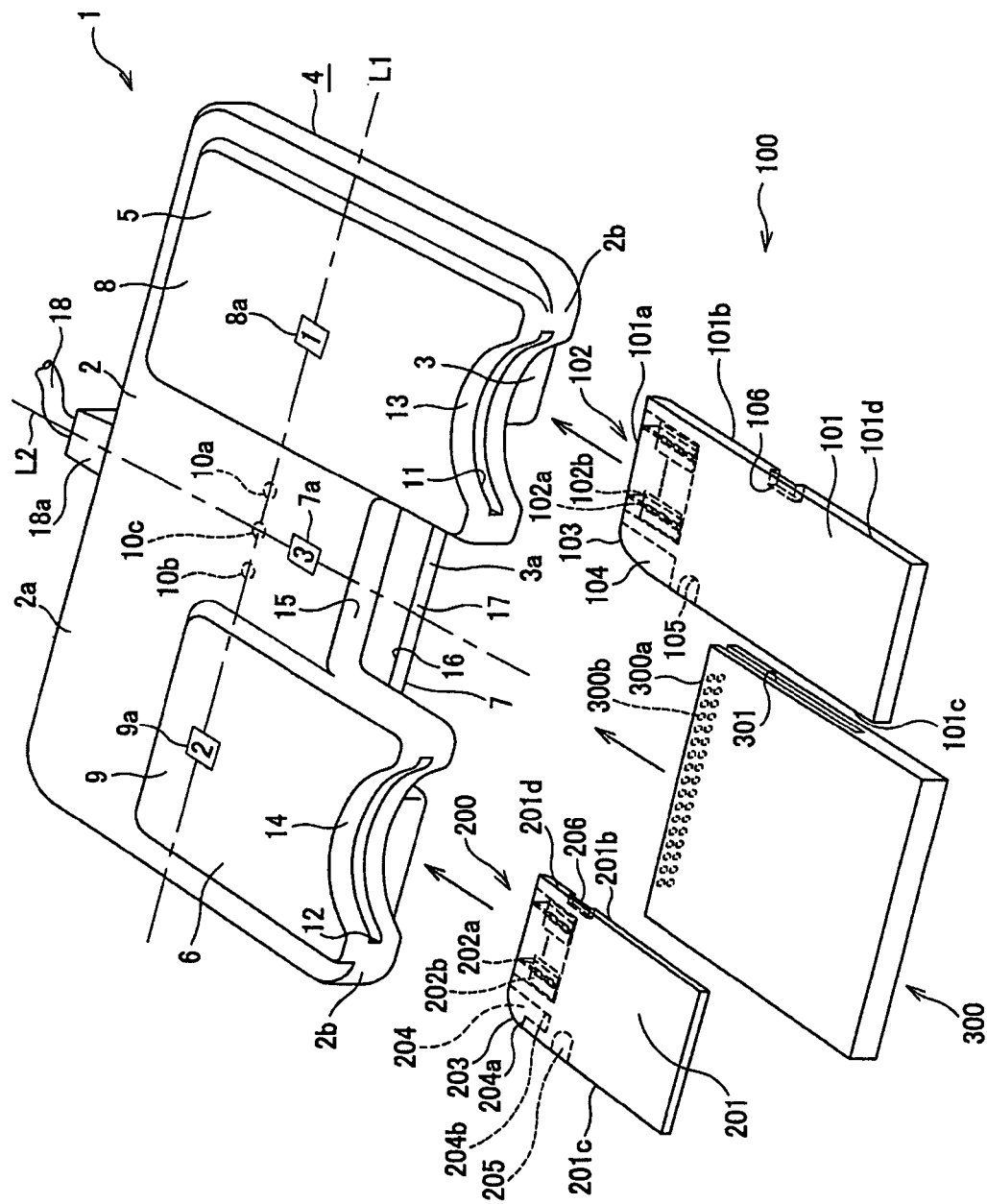
FIG. 1 is a schematic perspective view of a loading apparatus according to the invention, illustrating how it is operated.
Figure 2:
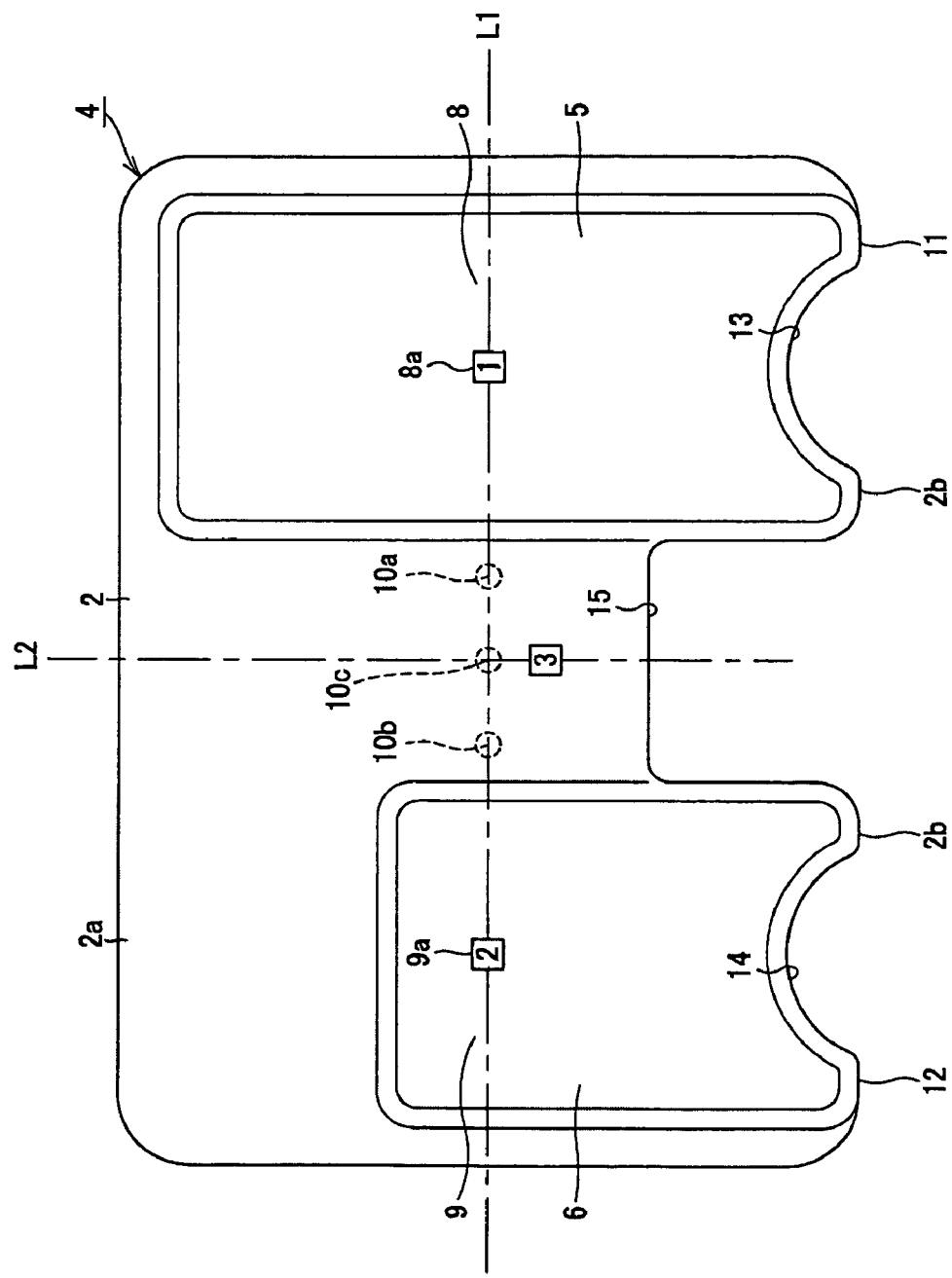
FIG. 2 is a schematic plan view of the loading apparatus of FIG. 1.
Figure 3:
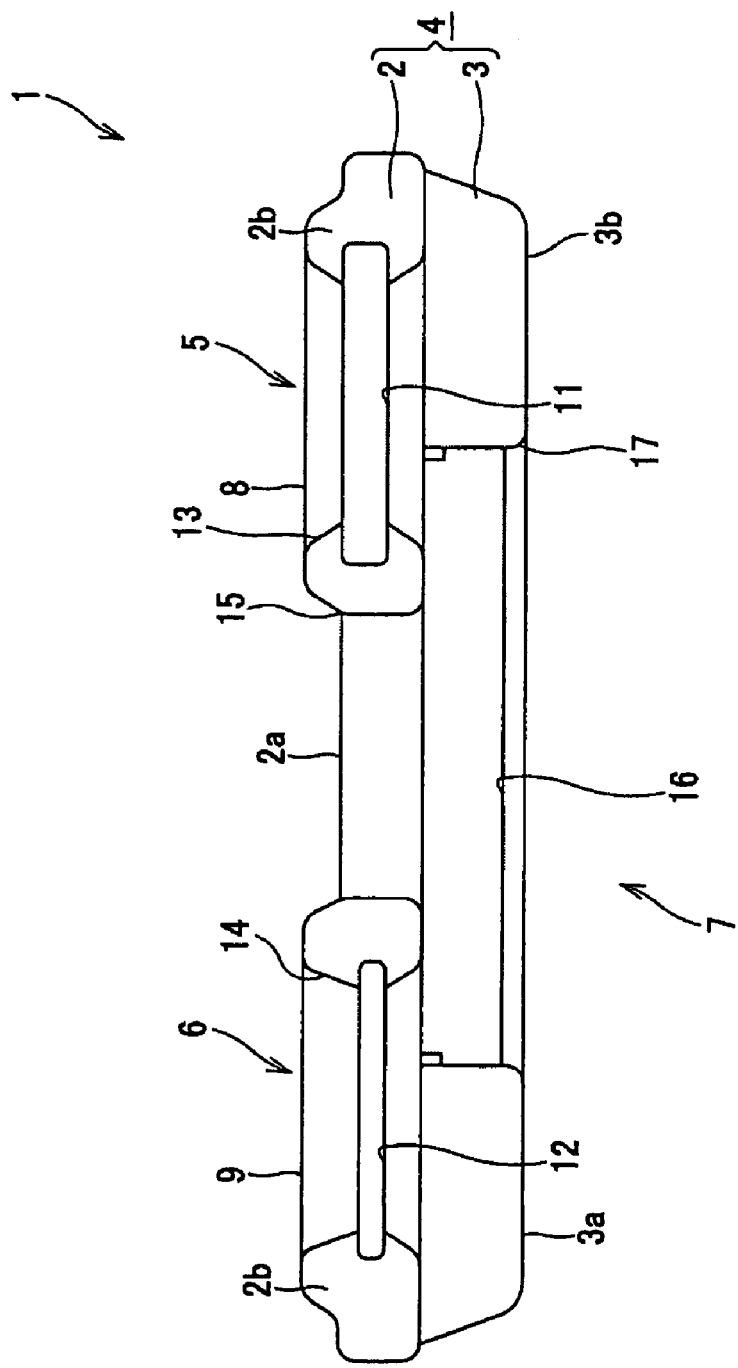
FIG. 3 is a schematic front view of the loading apparatus of FIG. 1.
Figure 4:
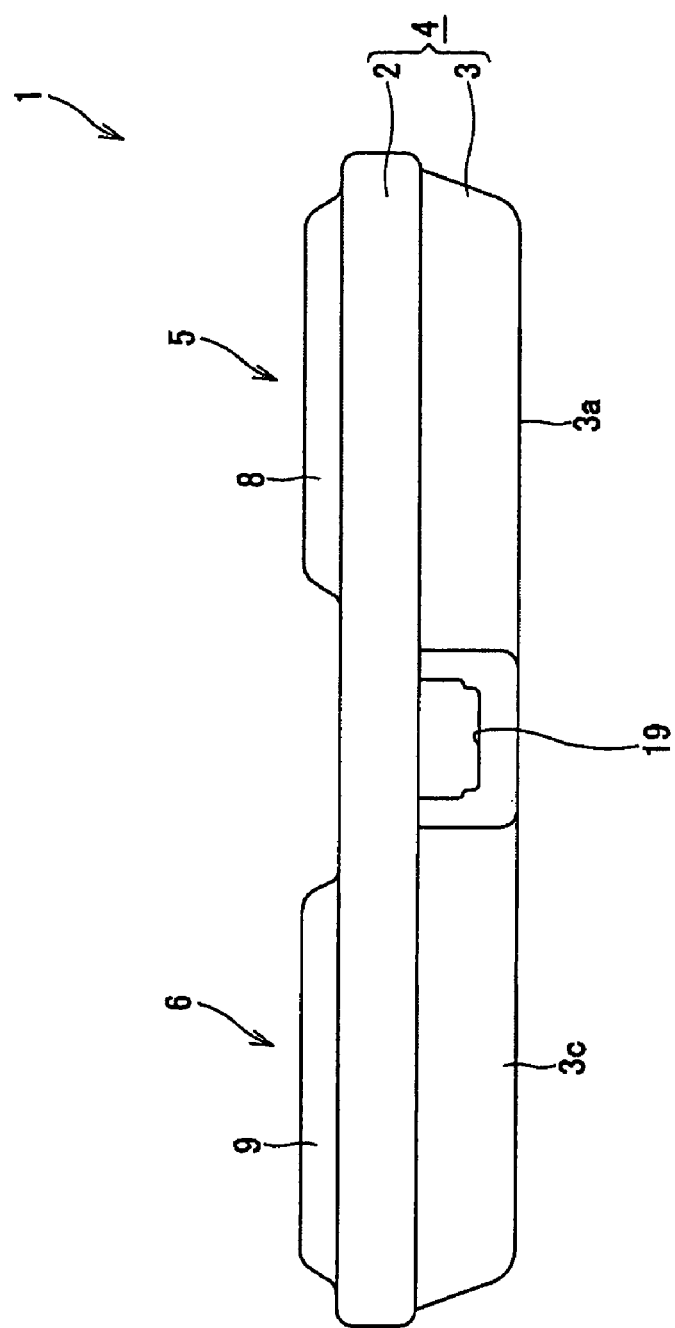
FIG. 4 is a schematic rear view of the loading apparatus of FIG. 1.
Figure 5:
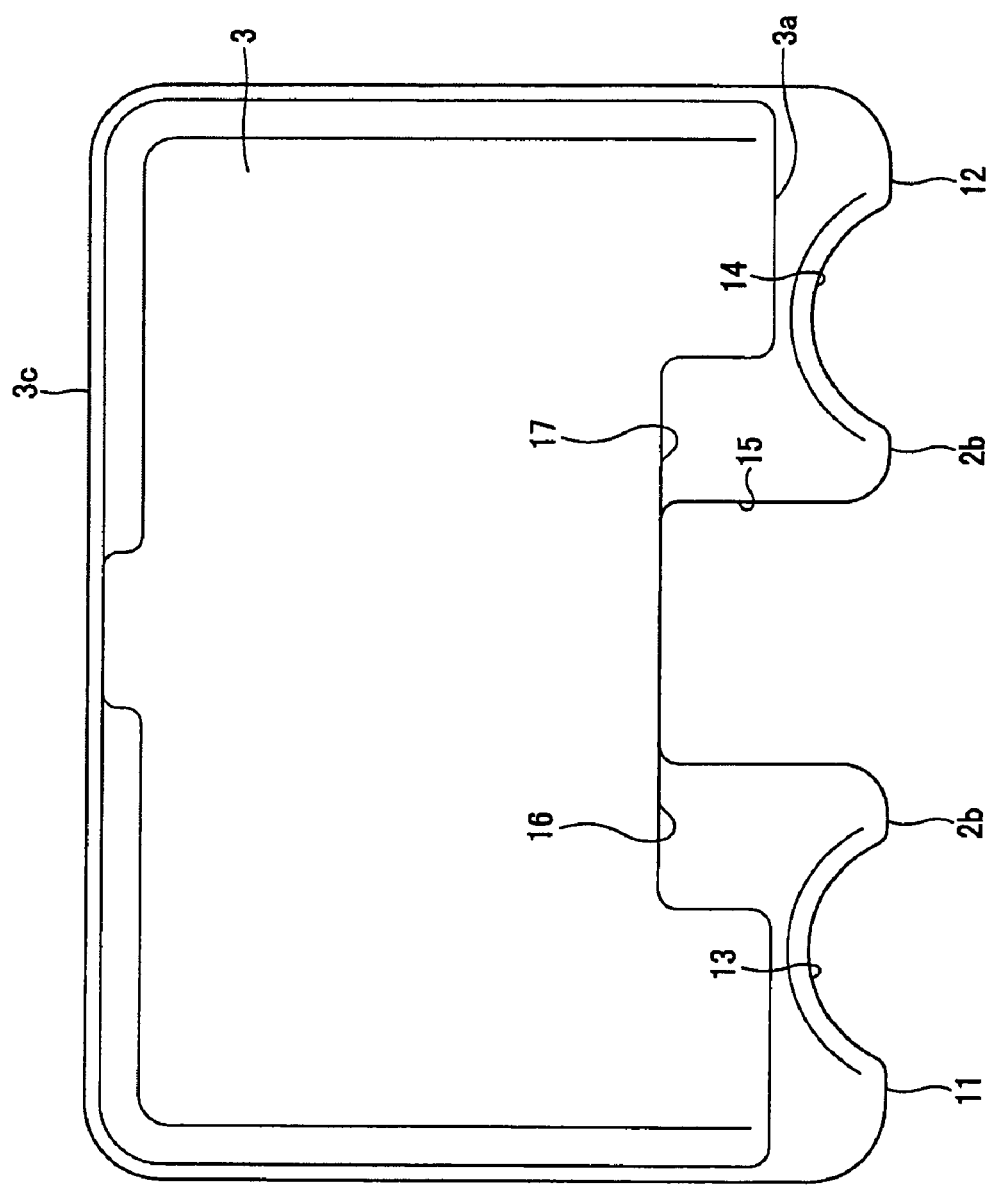
FIG. 5 is a schematic bottom view of the loading apparatus of FIG. 1.
Figure 6:
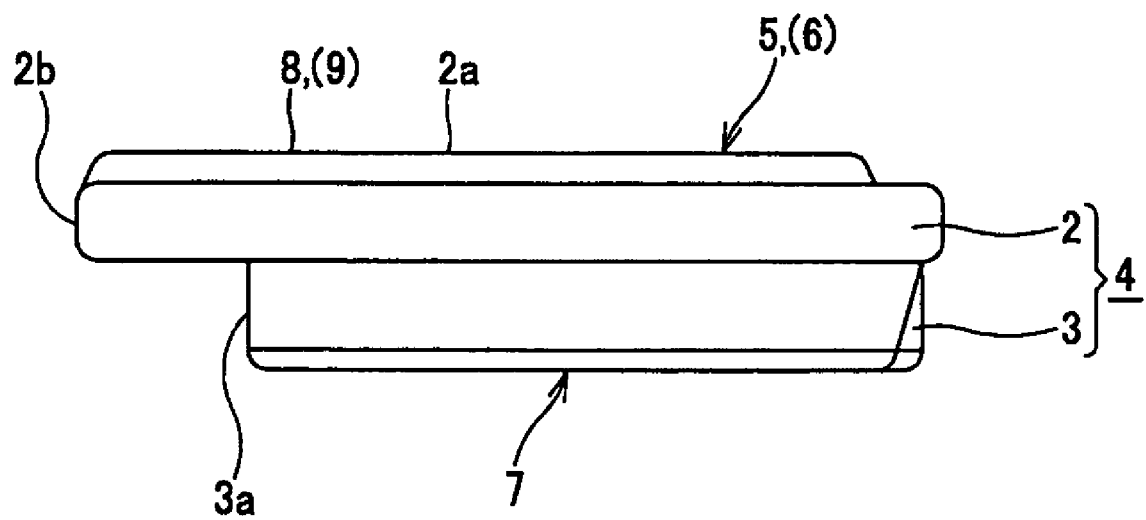
FIG. 6 is a schematic lateral view of the loading apparatus of FIG. 1.

As shown in FIG. 1, the loading apparatus 1 is an adaptor apparatus having three loading sections for receiving three card-type recording mediums, or IC cards, 100, 200, 300 of different shapes.

Now the three IC cards of different shapes will be described by referring to FIG. 1. The first IC card 100 comprises a substantially rectangular plate-shaped card main body 101 prepared by molding synthetic resin; card main body 101 contains therein a semiconductor memory element, such as a flash memory having a large memory capacity of 4 MB, 16 MB, 32 MB, 64 MB, 128 MB, 256 MB, . . . , 1 GB or 2 GB, a control circuit element having a control circuit section for controlling the operation of writing data to and reading data from the semiconductor memory element, and a plurality of semiconductor integrated circuit elements including a copyright protection circuit element, the elements being mounted on a printed circuit board.

The card main body 101 containing a plurality of semiconductor elements and a printed circuit board on which the semiconductor elements are mounted is made to have a mechanical strength that prevents the card main body 101 from being bent by ordinary external force applied thereto in operation in order to protect the semiconductor memory element and the other elements as well as the printed circuit board on which the semiconductor elements are mounted. More specifically, the card main body 101 is formed by a molded body of synthetic resin.

A terminal section 102 is formed on the front surface 101*a* of the card main body 101 of the IC card 100, which is located on one of the short sides of the card main body 101, so as to extend from the front surface 101*a* to the bottom surface 11*b*. A plurality of electrodes 102*b* are arranged in the terminal section 102 and separated from each other by partition walls 102*a*. The operation of reading data from or writing data to the memory element arranged in the card main body 101 is conducted by way of the electrodes 102*b* arranged in the terminal section 102. Engaging recesses are defined by the partition walls 102*a* of the terminal section 102 for their boundaries and the electrodes 102*b* are arranged on the bottoms surfaces of the respective engaging recesses so as to be protected against being touched directly by fingers. For example, a total of ten electrodes 102*b* may be arranged in the respective engaging recesses.

Thus, the first IC card 100 is provided with ten electrodes 102*b* in the terminal section 102. Data are exchanged between the loading apparatus 1, in which the first IC card 100 is loaded, and a host apparatus typically by way of a serial interface, using the electrodes 102*b* arranged in the terminal section 102. More specifically, the electrodes 102*b* include at least one that operates as an input terminal of a serial protocol bus state signal BS, one that operates as an input terminal of a serial protocol data signal SDIO, one that operates as an input terminal of a serial clock SCLK and one that operates as a supply voltage VCC terminal. Data may alternatively be exchanged between the loading apparatus 1 and a host apparatus by way of a parallel interface.

A substantially round chamfered section 103 is formed at one of the corners of the front surface 101*a* where the terminal section 102 of the card main body 101 is arranged. A wrong-insertion preventing groove 104 is formed on the lateral surface 101*c* of the card main body 101 where the chamfered section 103 is formed by partly cutting out the bottom surface 101*b* of the card main body 101 so as to be directly linked to the chamfered section 103. The chamfered section 103 and the wrong-insertion preventing groove 104 define the direction in which the first IC card 100 is inserted into the loading apparatus 1 and prevents an incorrect card from being loaded in the latter.

The lateral surface 101*c* of the card main body 101 also is provided with a fall preventing recess 105 that allows the IC card 100 inserted into the loading apparatus 1 to be engaged with a resilient engaging piece provided on the loading apparatus 1 side and prevents it from falling out of the loading apparatus 1. An engaging recess 106 to be engaged with the ejection mechanism arranged at the loading section side of the loading apparatus 1 or the host apparatus to eject the first IC card 100 out of the loading section is formed substantially at the middle of the other lateral surface 101*d* of the card main body 101. The engaging recess 106 is formed by cutting out part of the lateral surface 101*d* that runs in parallel with the direction of insertion of the first ID card 100 into the loading apparatus 1 or the host apparatus so as to extend to the bottom surface 101*b*. It becomes engaged with the ejection mechanism arranged at the loading section side of the host apparatus only when the first IC card 100 is correctly inserted into the loading/unloading aperture of the loading apparatus 1 or the host apparatus.

The first IC card 100 having the above-described configuration is put into the loading apparatus 1 or the host apparatus by way of the corresponding loading/unloading aperture thereof, using the front surface 101*a* where the terminal section 102 is arranged as a leading side.

Now the second IC card 200 will be described also by referring to FIG. 1. The second IC card 200 is a small IC card, shorter than the first IC card. It has terminals the number of which is equal to that of the first IC card and which are realized according to an electric specification substantially similar to that of the first IC card. The second IC card 200 comprises a substantially rectangular plate-shaped card main body 201 prepared by molding synthetic resin, which card main body 201 contains therein a semiconductor memory element, such as a flash memory having a large memory capacity of 4 MB, 16 MB, 32 MB, 64 MB, 128 MB, 256 MB, . . . , 1 GB or 2 GB, a control circuit element having a control circuit section for controlling the operation of writing data to and reading data from the semiconductor memory element, and a plurality of semiconductor integrated circuit elements including a copyright protection circuit element, the elements being mounted on a printed circuit board.

The card main body 201 containing a plurality of semiconductor elements and a printed circuit board on which the semiconductor elements are mounted is made to have a mechanical strength that prevents the card main body 201 from being bent by ordinary external force applied thereto in operation in order to protect the semiconductor memory element and the other elements as well as the printed circuit board on which the semiconductor elements are mounted. More specifically, the card main body 201 is formed by a molded body of synthetic resin.

A terminal section 202 is formed on the front surface 201*a* of the card main body 201, which is located on one of the short sides of the card main body 201 and operates as a leading side when the second IC card 200 is inserted into the loading apparatus 1 or the host apparatus, so as to extend from the front surface 201*a* to the bottom surface 201*b*. A plurality of engaging recesses are arranged in the terminal section 202, and their boundaries are defined by partition walls 202*a*, whose number corresponds to that of the electrodes 202*b* of the second IC card 200. The engaging recesses are open at the side of the front surface 201*a* and also at that of the bottom surface 201*b* of the card main body 201, so that they may be engaged with a plurality of terminals arranged on the loading apparatus 1 or the loading section side of the host apparatus. The plurality of electrodes 202*b* are arranged on the bottom surfaces of the respective engaging recesses and separated from each other by the partition walls 202*a*. Since the plurality of electrodes 202*b* are arranged on the bottom surfaces of the respective engaging recesses that are separated from each other and have sizes smaller than that of a finger tip, they are protected from being touched directly by a finger tip or some foreign object of such a size at the time of handling the IC card and hence reliably protected against being contaminated and/or damaged.

Thus, the second IC card 200 is provided with ten electrodes 202*b* in the terminal section 202. Data are exchanged between the loading apparatus 1, in which the second IC card 200 is loaded, and a host apparatus typically by way of a serial interface, using the electrodes 202*b* arranged in the terminal section 202. More specifically, the electrodes 202b include at least one that operates as an input terminal of a serial protocol bus state signal BS, one that operates as an input terminal of a serial protocol data signal SDIO, one that operates as an input terminal of a serial clock SCLK and one that operates as a supply voltage VCC terminal. Alternatively, data may be exchanged between the loading apparatus 1 and a host apparatus by way of a parallel interface.

A chamfered section 203 is formed at one of the corners of the front surface 201a where the terminal section 202 of the card main body 201 is arranged in order to allow the user to easily see the right leading edge when inserting the second IC card 200 into the loading apparatus 1 or the host apparatus. A wrong-insertion preventing groove 204 is formed on the front surface 201a and the lateral surface 201c of the card main body 201 where the chamfered section 203 is formed by partly cutting out the bottom surface 201b of the card main body 201 so as to be stepped back from the bottom surface 201b of the card main body 201. The wrong-insertion preventing groove 204 is provided with a protrusion 204a that is extended from the lateral surface 201c where the chamfered section 203 is formed and whose top surface is substantially flush with the bottom surface 201b. As the protrusion 204a arranged in the wrong-insertion preventing groove 204, a wrong-insertion preventing recess 204b is defined in the inside thereof to prevent the IC card 200 from being put into an incorrect loading/unloading aperture of the loading apparatus 1 or the host apparatus. When the second IC card 200 is correctly put into the correct loading/unloading aperture of the loading apparatus 1 or the host apparatus, the wrong-insertion preventing recess 204b becomes engaged with the wrong-insertion preventing projection arranged in the loading apparatus 1 or the host apparatus to allow the second IC card 200 to be loaded in it. The wrong-insertion preventing recess 204b differs from the wrong-insertion preventing groove 104 of the first IC card 100 in terms of profile so that the second IC card 200 is prevented from being mistakenly inserted into the loading section for the first IC card 100 by the difference of profile.

The bottom surface 201b of the card main body 201 where the chamfered section 203 is formed is provided at a position near the wrong-insertion preventing groove 204 with a fall preventing recess 205 for preventing the second IC card 200 from falling from the loading section for the second IC card 200 when the second IC card 200 is loaded into the loading apparatus 1 or the host apparatus. The fall preventing recess 205 is formed by cutting out the lateral surface 201c running in parallel with the direction in which the second IC card 200 is inserted into the loading apparatus 1 or the host apparatus and the bottom surface 201b of the second IC card 200. The fall preventing recess becomes engaged with the fall preventing piece arranged on the loading apparatus 1 or the host apparatus only when the second IC card 200 is correctly inserted into the loading/unloading aperture of the loading apparatus 1 or the host apparatus.

An engaging recess 206 to be engaged with the ejection mechanism arranged at the loading section side of the loading apparatus 1 or the host apparatus to eject the second IC card 200 out of the loading section is formed on the bottom surface 201b of the card main body 201 where the chamfered section 203 is formed. The engaging recess 206 is formed by cutting out part of the lateral surface 201d that runs in parallel with the direction of insertion of the second IC card 200 into the loading apparatus 1 or the host apparatus so as to extend to the bottom surface 201b. It becomes engaged with the ejection mechanism arranged at the loading section side of the host apparatus only when the second IC card 200 is correctly inserted into the loading/unloading aperture of the loading apparatus 1 or the host apparatus.

The second IC card 200 having the above described configuration is put into the loading apparatus 1 or the host apparatus by way of the corresponding loading/unloading aperture thereof, using the front surface 201a where the terminal section 202 is arranged as a leading side.

Now the third IC card 300 will be described. The third IC card 300 is an IC card whose electric and physical specifications differ from those of the first IC card 100 and those of the second IC card 200 and which has a substantially rectangular profile. The front surface 300a of the third IC card 300 that runs along one of the long sides of the rectangle and operates as the leading side of third IC card 300 is provided with a plurality of terminal sections 300b. The third IC card 300 is provided at the lateral surfaces thereof that run in parallel with the direction of insertion of the third IC card 300 with respective insertion guide grooves 301. While the first and second IC cards 100, 200 are provided at the sides thereof that operate as leading sides when the cards are inserted into the loading apparatus 1 or the host apparatus respectively with chamfered sections 103, 203, the third IC card 300 is not provided with any chamfered section for identifying the leading side thereof when the IC card 300 is inserted into the loading apparatus 1 or the host apparatus. The third IC card 300 having the above-described configuration is loaded into the loading apparatus 1 or the host apparatus through the loading/unloading aperture of the loading apparatus 1 or the host apparatus, using the front surface 300a thereof where the terminal sections 300b are arranged as leading side.

Thus, the second IC card 200 has an electric specification that is substantially similar to that of the first IC card 100, but it shows a plan view different from that of the first IC card 100 because its long sides are much shorter than those of the first IC card 100. The third IC card 300 has long sides and short sides whose lengths differ from those of the first IC card 100 and those of the second IC card 200. The loading apparatus 1 of the present invention receives these three IC cards 100, 200, 300 of different shapes.

Referring to FIGS. 1 through 6, the loading apparatus 1 for receiving the first through third IC cards 100, 200, 300 has an apparatus main body 4 formed by combining an upper case 2 and a lower case 3. A first loading section 5 and a second loading section 6 for receiving respectively the first IC card 100 and the second IC card 200 are arranged at the side of the top surface 2a of the apparatus main body 4, while a third loading section 7 for receiving the third IC card 300 is arranged at the side of the bottom surface 3b in the apparatus main body 4. The apparatus main body 4 contains therein a printed circuit board where control circuits and other electric circuits are incorporated and also connectors that correspond respectively to the first through third IC cards 100, 200, 300 and are arranged respectively in the first through third loading sections 5, 6, 7 that are mounted on the printed circuit board. The first through third loading sections 5, 6, 7 are provided with respective ejection mechanisms, fall preventing mechanisms and wrong-insertion preventing mechanisms that correspond to the respective IC cards to be loaded. The first through third loading sections 5, 6, 7 are connected electrically to the terminal sections 102, 202, 300b, respectively, of the first through third IC cards 100, 200, 300. The upper and lower cases 2, 3 are formed by injection molding of synthetic resin. Particularly, the upper case 2 is made of a light-transmitting synthetic resin material so as to transmit light from identifier lamps, which may typically be LEDs (light emitting diodes) mounted on the printed circuit board contained therein.

The first through third loading sections 5, 6, 7 are so sized as to almost entirely contain and hold the first through third IC cards 100, 200, 300, respectively, therein. A first bulged section 8 showing a plan view similar to that of the first IC card 100 to be loaded in the first loading section 5 is formed on the first loading section 5, while a second bulged section 9 showing a plan view similar to that of the second IC card 200 to be loaded in the second loading section 6 is formed on the second loading section 6. The first bulged section 8 and the second bulged section 9 show plan views similar to that of the first IC card 100 and that of the second IC card 200, respectively, so that their profiles differ from each other, and hence it is possible for the user to discriminate and identify the position of the first loading section 5 and that of the second loading section 6 simply by touching them without viewing them for confirmation.

The profiles of the first and second bulged sections 8, 9 are not limited to the illustrated ones. For example, the first IC card 100 is larger than the second IC card 200. Therefore, as for the first and second bulged sections 8, 9, the first bulged section formed on the first loading section 5 for receiving the first IC card 100 may be made larger than the second bulged section 9 formed on the second loading section 6 for receiving the second IC card 200 instead of making the first and second bulged sections 8, 9 correspond to the respective contours of the plan views of the first and second IC cards 100, 200.

The upper case 2 is provided at the front surface 2b thereof with a first loading/unloading aperture 11 for receiving the first IC card 100, which aperture is directly connected to the first loading section 5, and also with a second loading/unloading aperture 12 for receiving the second IC card 200, which aperture is directly connected to the second loading section 6. The first loading section 5 is provided at corresponding positions located respectively above and below the first loading/unloading aperture 11 with a first notched section 13 for exposing a to-be-pinched part of the first IC card 100 loaded in the first loading section 5, so as to allow it to be pinched typically between the thumb and the forefinger of a hand of the user when the first IC card 100 is pulled out of the loading apparatus 1. Similarly, the second loading section 6 is provided at corresponding positions located respectively above and below the second loading/unloading aperture 12 with a second notched section 14 for exposing a to-be-pinched part of the second IC card 200 loaded in the second loading section 6, so as to allow it to be pinched typically between the thumb and the forefinger of a hand of the user when the second IC card 200 is pulled out of the loading apparatus 1. A third notched section 15 is formed between the first loading/unloading aperture 11 and the second loading/unloading aperture 12 with an aperture formed on the front surface thereof in such a way that the aperture is recessed from the first and second loading/unloading apertures 11, 12. The first loading/unloading aperture 11 and the second loading/unloading aperture 12 are aligned with the third notched section 15 interposed between them. Thus, the third notched section 15 separates the first loading/unloading aperture 11 and the second loading/unloading aperture 12 from each other so that the user can easily discriminate them, and a rear surface side to-be-pinched part of the third IC card 300 loaded in the third loading section 7 is exposed so as to be pinched typically between the thumb and the forefingers of a hand of the user when the third IC card 300 is pulled out of the loading apparatus 1.

The first bulged section 8 is provided with a first display section 8a for displaying the type (shape) of the first IC card 100 to be loaded, and the second bulged section 9 is provided with a second display section 9a for displaying the type (shape) of the second IC card 200 to be loaded. A third display section 7a is arranged between the first bulged section 8 and the second bulged section 9 for the purpose of displaying the type (shape) of the third IC card 300 to be loaded in the third loading section 7. The first display section 8a and the second display section 9a are arranged on an imaginary line L1 running in parallel with the long sides of the apparatus main body 4 and dividing the short sides of the apparatus main body 4 into equal lengths, while the third display section 7a is arranged closer to the front surface of the apparatus main body 4 from the imaginary line L1.

First through third access indicator sections 10a, 10b, 10c are arranged on the imaginary line L1 between the first bulged section 8 and the second bulged section 9 so as to be turned on when the first through third IC cards 100, 200, 300 loaded in the first through third loading sections 5, 6, 7 are accessed respectively. The first access indicator section 10a is turned on when the first IC card 100 loaded in the first loading section 5 is being accessed, and the second access indicator section 10b is turned on when the second IC card 200 loaded in the second loading section 6 is being accessed, while the third access indicator section 10c arranged at the center is turned on when the third IC card 300 loaded in the third loading section 7 is being accessed. The third access indicator section 10c is arranged substantially at the middle of an imaginary line L2 running in parallel with the short sides of the apparatus main body 4 and dividing the long sides of the apparatus main body 4 into equal lengths along with the third display section 7a.

The first through third access indicator sections 10a, 10b, 10c are arranged in the order of arrangement of the first through third loading sections 5, 6, 7 so that each of the first through third access indicator sections 10a, 10b, 10c makes light from the corresponding one of the LEDs mounted on the printed circuit board 4 visible to the user through the light transmitting upper case 2 when the LED is turned on to emit light. In other words, the undulations due to the access indicator sections are minimized to make the surface of the apparatus main body 4 very smooth when touched by hand.

As pointed out above, since the first through third display sections 8a, 9a, 7a are arranged in the order of arrangement of the first through third loading sections 5, 6, 7, it is easy for the user to visually identify the positions of the first through third loading sections 5, 6, 7. Similarly, the first through third access indicator sections 10a, 10b, 10c are also arranged in the order of arrangement of the first through third loading sections 5, 6, 7, so it is easy for the user to visually identify any of the first through third IC cards 100, 200, 300 loaded respectively in the first through third loading sections 5, 6, 7 that are being accessed by the host apparatus.

Still additionally, the first and second display sections 8a, 9a and the first through third access indicator sections 10a, 10b, 10c are aesthetically appealing because they are arranged on the single imaginary line L1. Similarly, the third access indicator section 10c and the third display section 7a are also aesthetically appealing because they are arranged on the single imaginary line L2.

The lower case 3 that is combined with the above-described upper case 2 is formed in such a way that its front surface 3a is located inside relative to and in parallel with the front surface 2b of the upper case 2. The front surface 3a is provided substantially at the center thereof with a third loading/unloading aperture 16 that is directly connected to the third loading section 7 for receiving the third IC card 300. The third loading/unloading aperture 16 is located at the bottom of the third notched section 15. The lower case 3 is provided with a fourth notched section 17 that is recessed from the foremost line of the lower case. The front edge of the fourth notched section 17 is aligned with the front edge of the third notched section 15 of the upper case 2, but the fourth notched section 17 has a width greater than the third notched section 15. Thus, the third and fourth notched sections 15, 17 arranged respectively above and below the third loading/unloading aperture 16 are adapted to expose a to-be-pinched part of the third IC card 300 loaded in the third loading section 7 so as to allow it to be pinched typically between the thumb and the forefinger of a hand of the user when the third IC card 300 is pulled out of the loading apparatus 1. The lower case 3 is not provided on the bottom surface 3b thereof with a bulged section that corresponds to the third loading section 7 in order to make the bottom surface of the apparatus main body 4 very flat so that the apparatus main body 4 may be held stable when it is placed on a desk or the like with its bottom surface thereof held in contact with the top surface of the desk. The third loading section 7 is not provided with a bulged section additionally because the third loading section 7 is arranged close to the bottom surface 3b of the apparatus main body 4 at a level different from the level where the first and second loading sections 5, 6 are arranged and that is located close to the top surface 2a, and hence the third loading section 7 can be easily identified without such a bulged section.

The lower case 3 is provided at the rear surface 3c thereof with a jack 19 for receiving a plug 18a attached to a cable 18 for connecting the loading apparatus with a computer. The data transmitted from the host apparatus are written to any of the first through third IC cards 100, 200, 300 loaded respectively in the first through third loading sections 5, 6, 7 of the loading apparatus 1 according to the command transmitted from the host apparatus. Similarly, any of the data stored in the first through third IC cards 100, 200, 300 loaded respectively in the first through third loading sections 5, 6, 7 of the loading apparatus 1 are read to the host apparatus according to the command transmitted from the host apparatus. The interface between the loading apparatus 1 and the host apparatus is an interface to which power can be supplied to such an extent, and which makes it possible to write data to and read data from any of the first through third the IC cards 100, 200, 300. A USB (universal serial bus) is adopted in the above-described embodiment, although the interface is not limited to a USB and may alternatively be an interface conforming to the IEEE (the Institute of Electrical and Electronic Engineers) 1394 Standard. It may be so arranged that power is supplied to the loading apparatus 1 not from the host apparatus but from a battery contained in the loading apparatus 1 or a commercial power source. The apparatus main body 4 may alternatively be connected to the host apparatus wirelessly.

The above-described loading apparatus 1 is connected electrically to the host apparatus by way of a cable 18 connected to the jack 19 of the apparatus main body 4. When loading the first IC card 100 into the first loading section 5 by way of the first loading/unloading aperture 11 by using the terminal section 102 of the first IC card 100 as the leading side, the user can recognize the first loading section 5 by seeing and/or touching the first bulged section 8 and the first display section 8a. Thus, it is possible to prevent the first IC card 100 from being inserted mistakenly into the second loading section 6 or the third loading section 7.

Similarly, when loading the second IC card 200 into the second loading section 6 by way of the second loading/unloading aperture 12 by using the terminal section 202 of the second IC card 200 as the leading side. The user can recognize the second loading section 6 by seeing and/or touching the second bulged section 9 and the second display section 9a. Thus, it is possible to prevent the second IC card 200 from being inserted mistakenly into the first loading section 5 or the third loading section 7.

Furthermore, when loading the third IC card 300 into the third loading section 7 by way of the third loading/unloading aperture 16 by using the terminal section 300b of the third IC card 300 as leading side, the user can recognize the third loading section 7 by seeing and/or touching the first bulged section 8 and the third display section 7a. Thus, it is possible to prevent the third IC card 300 from being inserted mistakenly into the first loading section 5 or the second loading section 6.

When the host apparatus is accessing any of the first through third loading sections 5, 6, 7 containing respectively the first through third IC cards 100, 200, 300, the corresponding one of the first through third access indicator sections 10a, 10b, 10c arranged respectively for the first through third loading sections 5, 6, 7 is turned on to prevent the user from mistakenly pulling out the card from the corresponding loading section.

To use the loading apparatus, it is not necessary that all of the first through third IC cards 100, 200, 300 are loaded respectively into the first through third loading sections 5, 6, 7. In other words, it is sufficient that only one of the IC cards 100, 200, 300 is loaded in the corresponding loading section to operate the loading apparatus.

The first IC card 100 loaded in the first loading section 5 can be pulled out of the first loading section 5 by pinching the to-be-pinched part of the first IC card 100 located at the rear side thereof and exposed from the first notched section 13. Similarly, the second IC card 200 loaded in the second loading section 6 can be pulled out of the second loading section 6 by pinching the to-be-pinched part of the second IC card 200 located at the rear side thereof and exposed from the second notched section 14. Likewise, the third IC card 300 loaded in the third loading section 7 can be pulled out of the third loading section 7 by pinching the to-be-pinched part of the third IC card 300 located at the rear side thereof and exposed from the third and fourth notched sections 15, 17.

Figure 7:
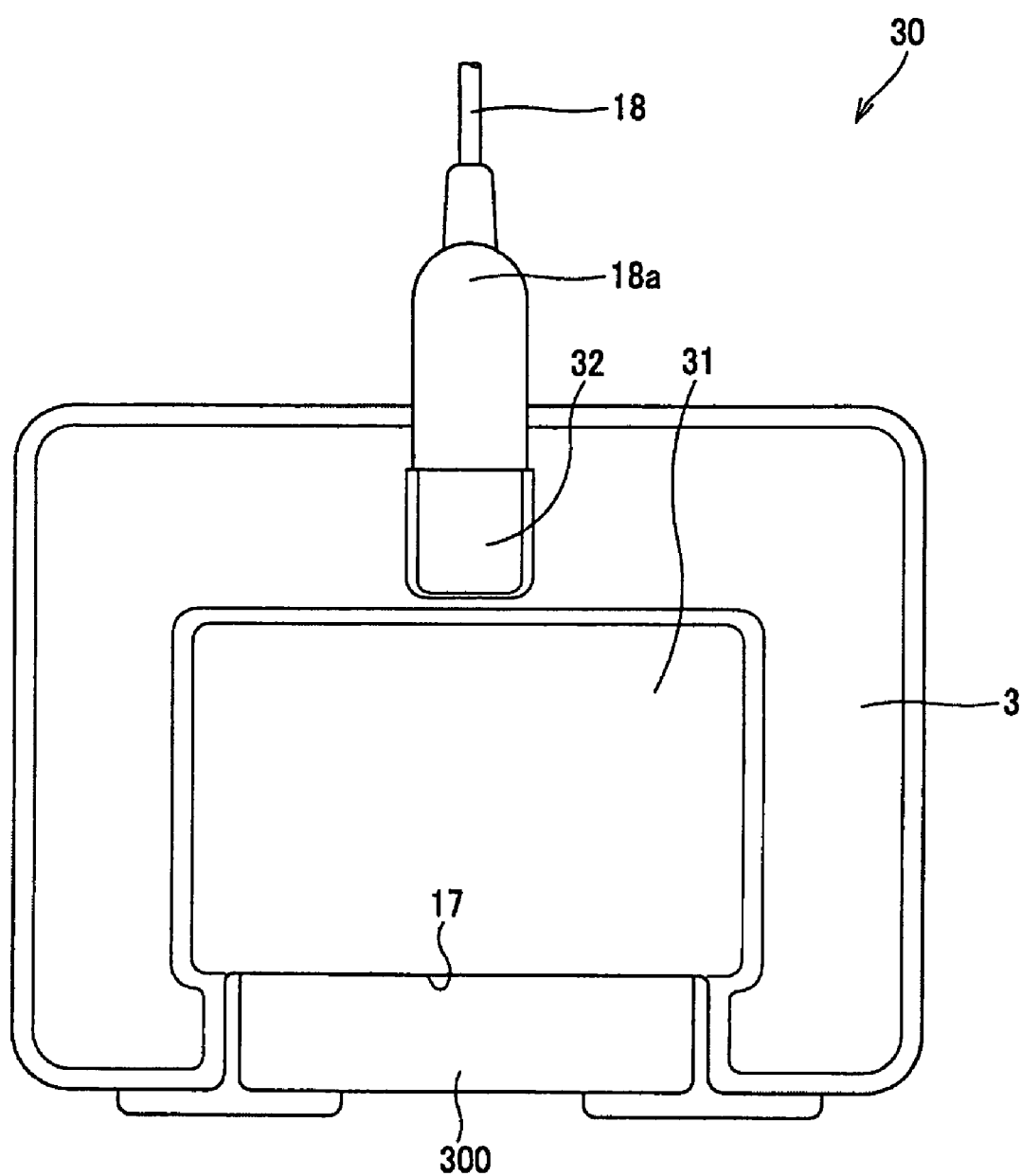
FIG. 7 is a schematic bottom view of a loading apparatus according to the invention and provided with a bulged section on the loading section on the bottom side.
Figure 8:
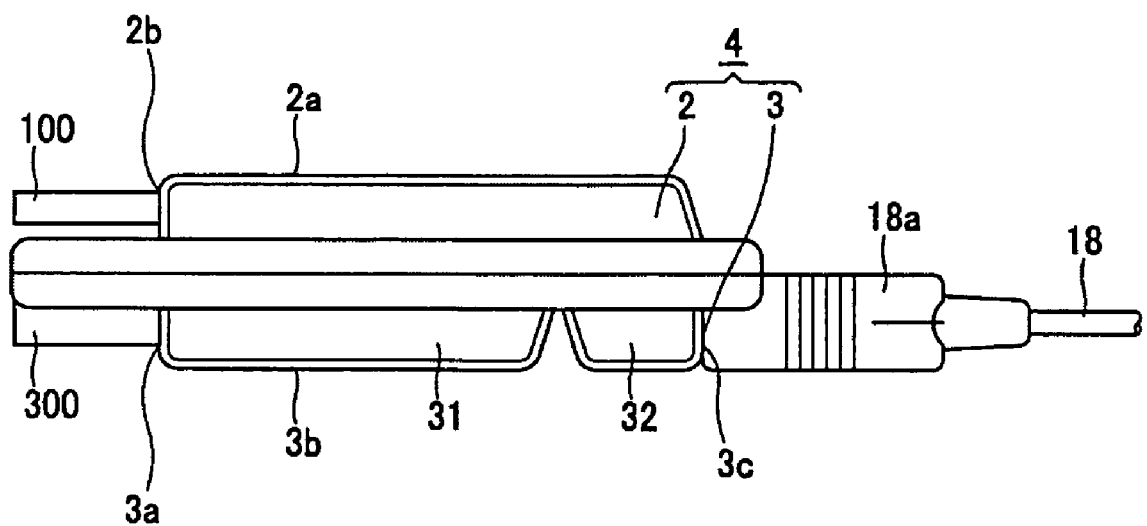
FIG. 8 is a schematic lateral view of the loading apparatus of FIG. 7.

Now another embodiment of loading apparatus according to the invention will be described by referring to FIGS. 7 and 8. While the third loading section 7 of the above described loading apparatus 1 is not provided with a bulged section, the third loading section 7 of the loading apparatus 30 illustrated in FIGS. 7 and 8 is provided with a third bulged section 31 whose plan view resembles that of the third IC card 300 to be loaded into the third loading section 7. The third bulged section 31 operates as a contact surface for the loading apparatus 30 when the loading apparatus 30 is placed on a desk or the like. Since the loading apparatus 30 is provided with a first bulged section 8 arranged on the first loading section 5, a second bulged section 9 arranged on the second loading section 6, and additionally a third bulged section 31 arranged under the third loading section 7, it is possible for the user to identify not only the positions of the first and second loading sections 5, 6 but also the top and bottom surfaces of the apparatus main body 4 and the position of the third loading section 7 by touching them. The loading apparatus 30 is provided on the bottom surface thereof with a fourth bulged section 32 at the position of the jack 19 that is flush with the third bulged section 31 in addition to the third bulged section 31, so that both the third bulged section 31 and the fourth bulged section 32 operate for contact surfaces of the loading apparatus 30 when the loading apparatus 30 is placed on a desk or the like.

Figure 9:
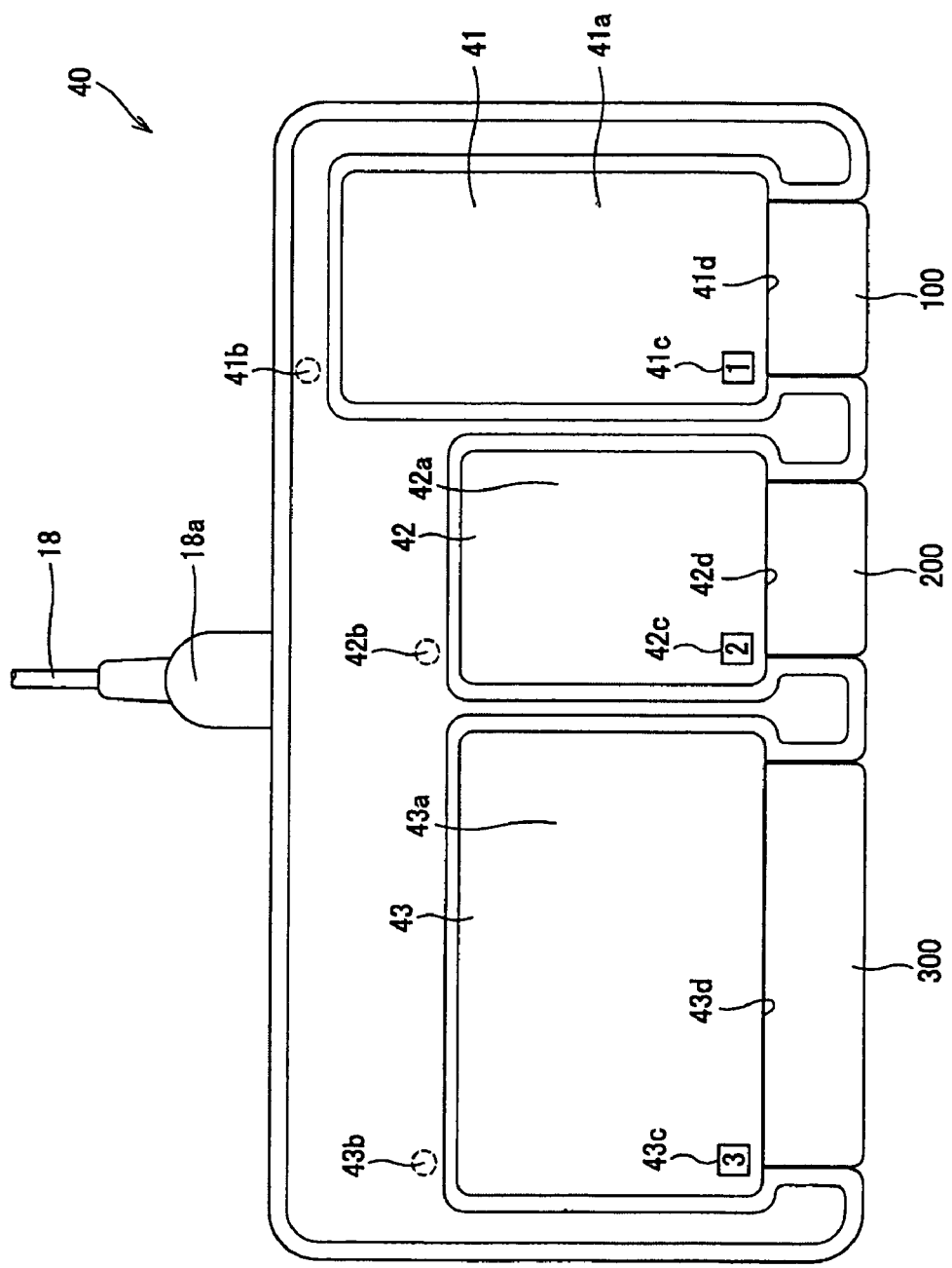
FIG. 9 is a schematic bottom view of a loading apparatus according to the invention and provided with three loading sections that are arranged in parallel on one of the major surfaces thereof.

FIG. 9 shows still another embodiment of a loading apparatus according to the present invention. In the loading apparatus 40 of FIG. 9, the first loading/unloading apertures 41d of the first loading section 41 for receiving the first IC card 100, the second loading/unloading aperture 42d of the second loading section 42 for receiving the second IC card 200 and the third loading/unloading aperture 43d of the third loading section 43 for receiving the third IC card 300 are arranged in parallel with each other near the upper surface and along the same lateral side of the apparatus.

More specifically, the first loading section 41 directly connected to the first loading/unloading aperture 41d for removably receiving the first IC card 100, the second loading section 42 directly connected to the second loading/unloading aperture 42d for removably receiving the second IC card 200 and the third loading section 43 directly connected to the third loading/unloading aperture 43d for removably receiving the third IC card 300 are arranged side by side between two oppositely disposed short sides of the loading apparatus 40. The first loading section 41 is provided with a first bulged section 41a showing a plan view similar to that of the first IC card 100 and the second loading section 42 is provided with a second bulged section 42a showing a plan view similar to that of the second IC card 200, while the third loading section 43 is provided with a third bulged section 43a showing a plan view similar to that of the third IC card 300. A first access indicator section 41b is arranged near the first bulged section 41a so as to be turned on when the host apparatus accesses the fast IC card 100 loaded in the first loading section 41 and a second access indicator section 42b is arranged near the second bulged section 42a so as to be turned on when the host apparatus accesses the second IC card 200 loaded in the second loading section 42, while a third access indicator section 43b is arranged near the third bulged section 43a so as to be turned on when the host apparatus accesses the third IC card 300 loaded in the third loading section 43.

Additionally, the first bulged section 41a is provided with a first display section 41c for displaying the type (shape) of the first IC card 100 to be loaded and the second bulged section 42a is provided with a second display section 42c for displaying the type (shape) of the second IC card 200 to be loaded, while the third bulged section 43a is provided with a third display section 43c for displaying the type (shape) of the third IC card 300. The first through third display sections 41c, 42c, 43c are arranged side by side along a line running in parallel with the long sides of the loading apparatus 40 to make them appear to be aesthetically appealing.

While the first through third loading sections 41, 42, 43 are arranged on the same surface of the loading apparatus 40 having the above described configuration, the user can easily identify any of the first through third loading sections 41, 42, 43 because the loading sections 41, 42, 43 are provided respectively with the first through third bulged sections 41a, 42a, 43a, which are by turn provided respectively with the first through third display sections 41c, 42c, 43c. Hence any of the first through third IC cards 100, 200, 300 is prevented from being inserted into a wrong loading section.

Figure 10:
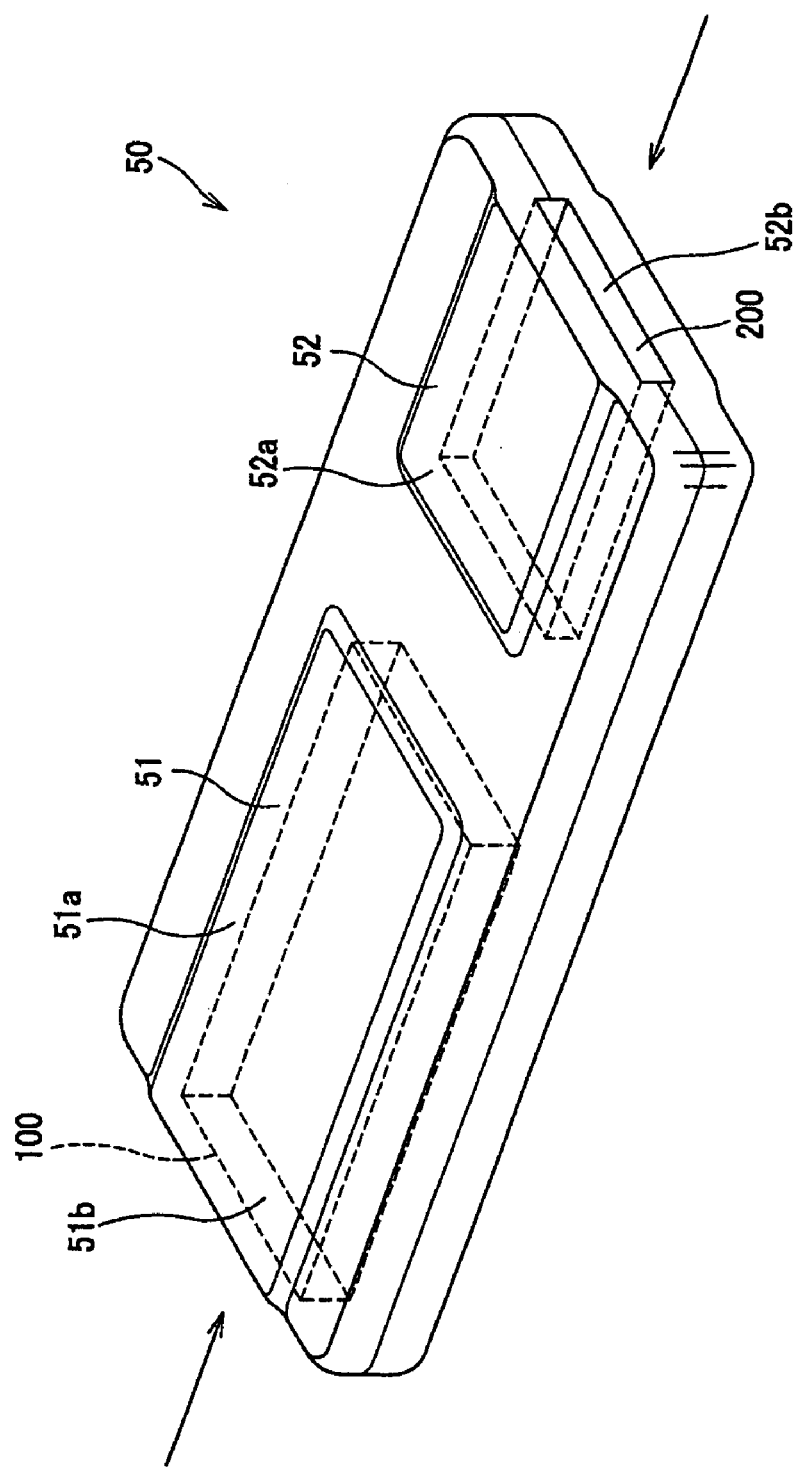
FIG. 10 is a schematic perspective view of a loading apparatus according to the invention and provided with two loading sections that are arranged in series on one of the major surfaces thereof.

Now still another embodiment of a loading apparatus according to the invention will be described by referring to FIG. 10. In the loading apparatus 50 illustrated in FIG. 10, a first loading section 51 for receiving the first IC card 100 and a second loading section 52 for receiving the second IC card 200 are arranged in series at the sides of the top surface of the apparatus. This loading apparatus 50 is provided with two loading sections for receiving two IC cards of different types (shapes), and no third loading section for receiving the third IC card 300 is provided.

The first loading section 51 is provided with a first bulged section 51a showing a plan view similar to that of the first IC card 100, and the second loading section 52 is provided with a second bulged section 52a showing a plan view similar to that of the second IC card 200. In this loading apparatus 50, a first loading/unloading aperture 51b is arranged at one of the oppositely-disposed short sides of the apparatus and directly connected to the first loading section 51, while a second loading/unloading aperture 52b is arranged at the other short side of the apparatus and directly connected to the second loading section 52.

While the first and second loading sections 51, 52 are arranged on the same surface of the loading apparatus 50 having the above described configuration, the user can easily identify either of the first and second loading sections 51, 52, and hence either of the first and second third IC cards 100, 200 is prevented from being inserted into a wrong loading section because the loading sections 51, 52 are provided respectively with the first and second bulged sections 51a, 52a.

While the loading apparatus 50 is equipped with a first loading section 51 for receiving the first IC card 100 and a second loading section 52 for receiving the second IC card 200 in the above description, it may be equipped alternatively with a loading section for receiving the first IC card 100 and another loading section for receiving the third IC card 300 or a loading section for receiving the second IC card 200 and another loading section for receiving the third IC card 300. The first and second bulged sections 51a, 52b may be provided with respective display sections for indicating the types (shapes) of the IC cards 100, 200 to be loaded and respective access indicator sections.

Figure 11:
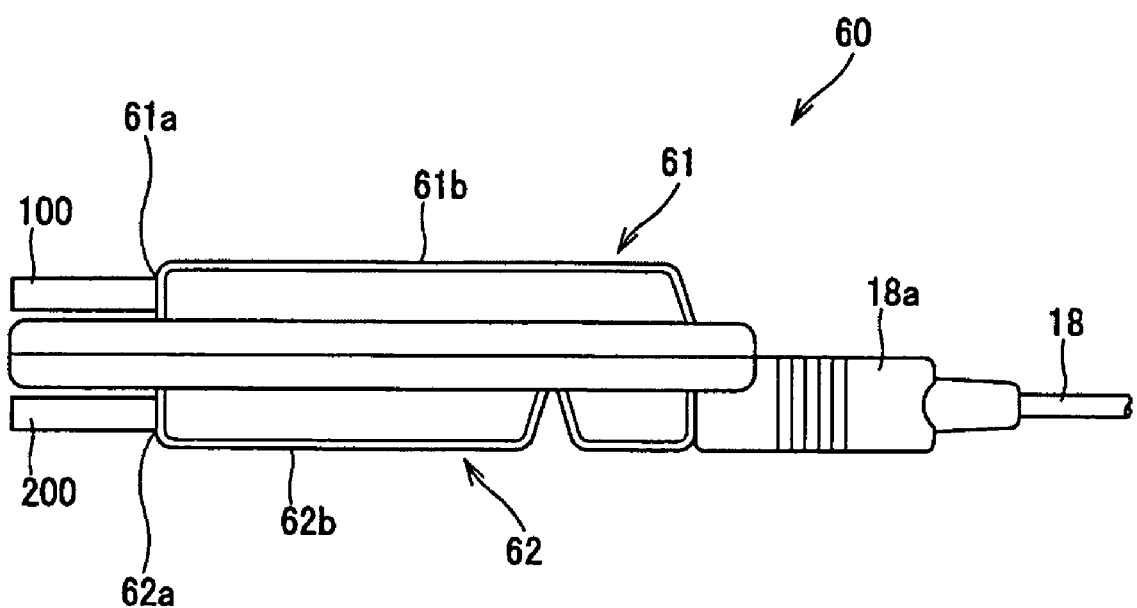
FIG. 11 is a schematic lateral view of a loading apparatus according to the invention and provided with two loading sections, one on the top surface and one on the bottom surface thereof.

Now still another embodiment of a loading apparatus according to the invention will be described by referring to FIG. 11. In the loading apparatus 60 illustrated in FIG. 11, a first loading section 61 for receiving the first IC card 100 is arranged at the side of one of the oppositely-disposed main surfaces and a second loading section 62 for receiving the second IC card 200 is arranged at the side of the other main surface. The first loading/unloading aperture 61a of the first loading section 61 and the second loading/unloading aperture 62a of the second loading section 62 are arranged at one of the short sides of the loading apparatus 60 so that the first and second IC cards 100, 200 can be removably inserted into the loading apparatus 60 from this side. The first loading section 61 is provided with a first bulged section 61b showing a plan view similar to that of the first IC card 100, and the second loading section 62 is provided with a second bulged section 62b showing a plan view similar to that of the second IC card 200.

While the first and second loading sections 61, 62 are arranged respectively on the oppositely-disposed main surfaces of the loading apparatus 60 having the above-described configuration, the user can easily identify either of the first and second loading sections 61, 62 because the loading sections 61, 62 are provided respectively with the first and second bulged sections 61b, 62b, and hence either of the first and second third IC cards 100, 200 is prevented from being inserted into a wrong loading section.

While the loading apparatus 60 is equipped with a first loading section 61 for receiving the first IC card 100 and a second loading section 62 for receiving the second IC card 200 in the above description, it may be equipped alternatively with a loading section for receiving the first IC card 100 and another loading section for receiving the third IC card 300 or a loading section for receiving the second IC card 200 and another loading section for receiving the third IC card 300. The first and second bulged sections 61b, 62b may be provided with respective display sections for indicating the types (shapes) of the IC cards 100, 200 to be loaded and respective access indicator sections.

While the loading sections of each of the above-described loading apparatuses 1, 30, 40, 50, 60 are provided with respective bulged sections that correspond to the IC cards 100, 200, 300 they receive so that the user may discriminate the loading sections by touching them to prevent any IC card from being inserted into a wrong loading section, it is not necessary that each of the bulged sections shows a plan view that corresponds to that of the related IC card as long as the user can discriminate the loading sections by touching them.

The types (shapes) of the IC cards to be loaded in any of the above described loading apparatus 1, 30, 40, 50, 60 are not limited to those of the IC cards 100, 200, 300. Nor is the number of loading sections that a loading apparatus according to the present invention comprises limited to the above-described ones. In other words, a loading apparatus according to the invention may comprise four or more than four loading sections that are provided with respective bulged sections.

What is claimed is:

1. A loading apparatus for card type recording mediums adapted to receive flat card type recording mediums of at least two different shapes, the apparatus comprising:
    an apparatus main body;
    a first loading section continuously extending from a first loading/unloading aperture arranged on the apparatus main body so as to receive a first card type recording medium;
    a second loading section continuously extending from a second loading/unloading aperture arranged on the apparatus main body so as to receive a second card type recording medium;
    an interface arranged in the apparatus main body and adapted to be connected to external equipment;
    a first bulged section being arranged on the first loading section of the apparatus main body; and
    a second bulged section being arranged on the second loading section, the second bulged section having a size different from that of the first bulged section.

2. The apparatus according to claim 1, wherein the first bulged section is formed to show a plan view similar to that of the first card type recording medium and the second bulged section is formed to show a plan view similar to that of the second card type recording medium.

3. The apparatus according to claim 1, wherein the first and second loading sections are arranged in parallel with each other in the apparatus main body.

4. The apparatus according to claim 3, wherein the first loading section and the second loading section are arranged at the side of one of the oppositely disposed main surfaces of the apparatus main body and a third loading section is arranged at the other side of the apparatus main body and continuously extending from a third loading/unloading aperture formed at one of the lateral sides of the apparatus main body so as to receive a third card type recording medium.

5. The apparatus according to claim 1, wherein the first loading/unloading aperture and the second loading/unloading aperture are arranged at a lateral side of the apparatus main body and aligned with each other.

6. The apparatus according to claim 1, wherein the apparatus main body is provided at a position between the first loading/unloading aperture and the second loading/unloading aperture with a notched section formed by cutting out the lateral side.

7. The apparatus according to claim 4, wherein the third loading/unloading aperture is arranged along a line parallel to a lateral side of the apparatus main body and recessed from the lateral side.

8. The apparatus according to claim 1, wherein the first loading section and the second loading section are arranged in series in the apparatus main body.

9. The apparatus according to claim 1, wherein the first loading section is arranged at the side of one of the oppositely disposed main surfaces of the apparatus main body and the second loading section is arranged at the side of the other main surface of the apparatus main body.

* * * * *